United States Patent [19]

Yamashita et al.

[11] 4,199,229
[45] Apr. 22, 1980

[54] SOLID STATE DISPLAY DEVICE

[75] Inventors: Akio Yamashita, Kawanishi; Akihiro Imai, Kyoto; Yoshiaki Hayashi, Osaka, all of Japan

[73] Assignee: Matsushita Electric Industrial Co., Ltd., Kadoma, Japan

[21] Appl. No.: 825,434

[22] Filed: Aug. 17, 1977

[30] Foreign Application Priority Data

Aug. 31, 1976 [JP] Japan .................. 51/104796
Oct. 27, 1976 [JP] Japan .................. 51/129655
Nov. 5, 1976 [JP] Japan .................. 51/133377

[51] Int. Cl.² ............................... G02F 1/17
[52] U.S. Cl. ......................... 350/357; 350/353
[58] Field of Search ............. 350/357, 355, 354

[56] References Cited

U.S. PATENT DOCUMENTS 3,630,603  12/1971  Letter .................. 350/357
3,649,116  3/1972   Hall .................... 350/355

*Primary Examiner*—James W. Davie
*Attorney, Agent, or Firm*—Cushman, Darby & Cushman

[57] ABSTRACT

A layer of a solid state compound including at least one compound selected from the group of fluorine and lead which compound prominently changes its light absorption factor when an electric field is applied thereto, thereby becoming black during the application of the electric field. Therefore, the solid state compound layer provided with at least an electrode on one face thereof can be used as a display device or a recorder.

14 Claims, 5 Drawing Figures

SOLID STATE DISPLAY DEVICE

BACKGROUND OF THE INVENTION

This invention relates to a novel solid state function device capable of displaying a numeral or letter.

For a display device, liquid crystal devices have become widely used in recent years. However, the liquid crystal devices have the shortcoming of a short life and being easily deteriorated by types of strong light such as UV or infrared rays.

SUMMARY OF INVENTION

This invention relates to a novel solid state function device capable of indicating a pattern by impressing an electric signal to its electrode.

DETAILED DESCRIPTION OF THE INVENTION

The inventors made an extensive research and study and found that a solid state compound semiconductor which contained at least one element selected from fluorine and lead prominently changed light absorption by impressing electric fields thereon.

For example, a thin layer of lead fluoride ($PbF_2$) and thallium fluoride ($TlF_3$) shows prominent light absorption when an electric field is impressed thereon. Also a layer of lead monoxide (PbO) shows a prominent light absorption when an electric field is impressed thereon and the light absorption is permanently retained when the impressed electric field is high.

The above-mentioned phenomenon can be hypothetically explained as follows:

The layer of solid state chemical compound, including at least one of fluorine and lead changes its ionic polarization when electrons and/or holes are made therein.

For the purpose of changing ion polarization, displacement of ions by impressing an electric field has hitherto been known. However, due to rigidity of the solid state compound, it cannot be considered to be the cause of the prominent changing of polarization.

The present inventors discovery described above is further hypothetically explained in that the ionic polarization of the solid state chemical compound can be changed by the donation of electrons and/or positive holes to the compound.

In order to realize easily the above-mentioned phenomenon, a solid state compound preferably should have as large an ionic polarization as possible. Of course, even for a solid state compound of a smaller ionic polarization, the same phenomenon can be theoretically expected to some extent. As naturally derived from the above-mentioned theory, compounds of having ionic bonding are more desirable than compounds of covalent bonding for the ionic polarization compounds.

Figure 1:
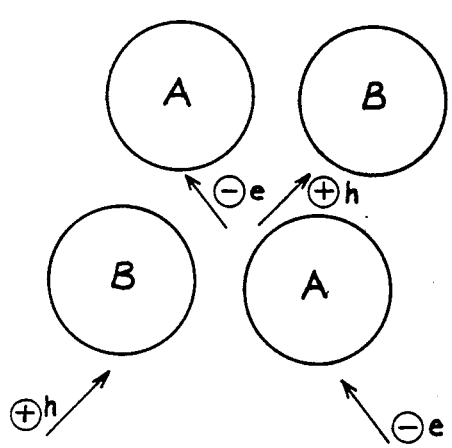
FIG. 1 is an enlarged schematic chart illustrating an ion polarization.

The inventors' hypothetical theory of the present invention is well proved by facts, and the theory will now be further elucidated in detail as follows:

As shown in FIG. 1, the ionic polarization compound comprises cations A and anions B. When an electric field is applied, and hence, positive holes "h" and electrons "e" are injected into the compound, the positive holes "h" and electrons "e" are injected into the ions of the compound, and the ionic polarization of the compound is changed. When the compound has a great ionic polarization characteristic, the holes are applied to the anions and the electrons are applied to the cations, respectively, and then the dielectric constant of the compound is increased, thereby increasing the refractive index, and as a result the light absorption increases. Such an increase of the light absorption upon the impression of an electric field is a novel phenomenon first discovered by the present inventors.

This phenomenon is particularly observed when the holes and electrons are effectively donated to the ions constituting the solid state compound. In order to obtain the effective donation of electrons and positive holes, preferably compounds having a large ion polarization are preferred.

Generally speaking, a larger ionic polarization is obtained as:

(a) the larger the ion radius is used and (b) the smaller the number of electrons of the outermost orbit, namely the more imperfect the disposition of the electron in the outermost shell from that of the perfect disposition of the neon atom.

Accordingly, there are the following orders of ionic polarizations:

$$I^- > Br^- > Cl^{31} > F^- \tag{1}$$

$$Pb^{2+} > Cd^{2+} > Sr^{2+} \tag{2}$$

The larger motive force for, or namely, a capability to make the ionic polarization is obtainable when:

(c) the smaller the ion radius is and (d) the smaller the number of electrons of the outermost orbit, namely the more imperfect the disposition of the electron in the outermost shell from that of the perfect disposition of the neon atom.

Accordingly, there are the following orders of the motive force of the ionic polarization:

$$Mg^{2+} > Ca^{2+} > Sr^{2+} > Ba^{2+} \tag{3}$$

$$Pb^{2+} > Cd^{2+} > Sr^{2+} \tag{4}$$

Among the many solid state chemical compounds capable of ionic polarizations, when the above-mentioned rules and stability of compounds are considered, the following compounds are considered typical compounds suitable for the phenomenon:

lead fluoride, cadmium fluoride, strontium fluoride, lead monoxide, lead chloride, cadmium oxide, cadmium chloride, thallium fluoride, mercury fluoride, barium fluoride.

Among the above-enlisted fluoride compounds belonging to the fluorite-type crystals, the barium fluoride and strontium fluoride have a rather small ionic polarization, and according to Goldschmidt's rule, mercury fluoride as well as strontium fluoride have little ionic bonding. Therefore, the most preferred fluoride compounds for realizing the above-mentioned newly discovered phenomenon of the present invention are: lead fluoride and thallium fluoride. Of course, the other listed fluoride compounds also performs the above-mentioned phenomenon but to a lesser extent.

In order to effectively give electrons and positive holes to the ion-polarizing compound, it is effective that suitable electrodes are disposed contacting it, that suitable atoms, molecular or their compositions are contained in the ion-polarizing compound or that suitable semiconductors of n-type and/or p-type are combined therein.

Another compound from the group of: lead bromide, lead iodide, lead acetate, lead carbonate, lead chromate, lead phosphate, lead telluride, lead selenide, tetraryl lead and Alkyl lead halide also performs the above-mentioned phenomenon, and moreover, these compounds of lead produce permanent black patterns when a large voltage is impressed thereon.

Examples of pattern indicating devices embodying the present invention are elucidated hereafter.

EXAMPLE 1

Figure 2:
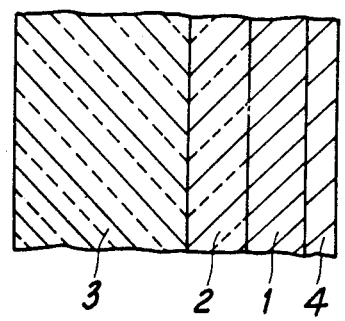
FIG. 2 is an enlarged schematic sectional view of a part of a first example embodying the present invention.

FIG. 2 is an enlarged sectional view of a function device embodying the present invention, wherein on a substrate of glass 3, a transparent electrode layer 2 of, for example $In_2O_3$ is formed by the CVD (known chemical vapor deposition) method. Then, a thin layer 1 of the ion-polarizing solid state semiconductor compound of lead fluoride ($PbF_2$) is formed also by the CVD method on the $In_2O_3$ electrode layer 2. Subsequently, a gold electrode film 4 is formed on the $PbF_2$ layer 1.

The lead fluoride ($PbF_2$) should be preferably pure, for example, above 99% pure for stable and clear indication, and a purity of the order of 99.9% to 99.99% is preferable. If the purity is low, the impurities form traps in the compound, thereby allowing the injected electrons and positive holes to make a recombination thereof and thereby obstructing the phenomenon of the present invention.

When a voltage is impressed across the $In_2O_3$ electrode 2 and the Au-electrode 4, the $PbF_2$ layer 1 turns black from its previous state of almost transparent. The blackening starts with a voltage of several D.C. volts across the electrodes 2 and 4, and the layer 1 turns to deeper black as the voltage increases.

When the voltage source is cut off, the black color gradually disapears over a period of from several minutes to several hours.

When the electrodes 2 and 4 are shortcircuited, then the black color is erased within several seconds.

When an inverse voltage is applied across the electrodes, the disappearance of black pattern, i.e., changing from black to transparent is made almost instantly.

The specific dielectric constant changes greatly, for example in the $PbF_2$, from 28 at the beginning when the $PbF_2$ layer is transparent, to 33 and to 42 as the layer turns blacker.

Because a considerable change of the specific dielectric constant may be obtained, a considerable change of capacity is obtainable across the electrodes 2 and 4. Therefore, the device can be used also as a voltage-dependent variable capacitor.

As elucidated in the abovementioned description, in order to effectively inject electrons and positive holes, use of a metal or a n-type semiconductor and p-type conductor, respectively, are useful for the electrode.

For the metal electrode to give electrons therefrom to the solid state compound, gold (Au) or platinum (Pt) is preferable.

For the n-type semiconductor to give electrons therefrom to the solid state compound, $In_2O_3$ or $SnO_2$ is preferable.

For the p-type semiconductor to give positive holes therefrom to the solid state compound, NiO, PbO, or $Cr_2O_3$ is preferable.

Since these metal oxide semiconductors are transparent, these are suitable for optical function display devices.

Other element semiconductors, for example, silicon and germanium can also be used for the electrodes. These semiconductors can be mixed as powder or grains with the indicating compound.

EXAMPLE 2

Figure 3:
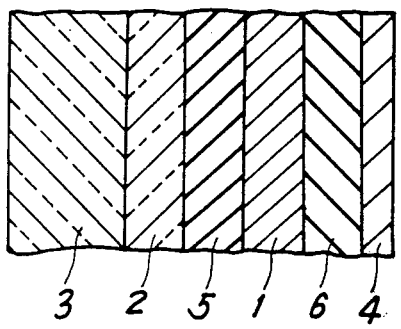
FIG. 3 is an enlarge schematic sectional view of a part of a second example embodying the present invention.

FIG. 3 is an enlarged sectional view of a function device embodying the present invention, wherein on a substrate 3 of glass, a transparent electrode layer 2 of $In_2O_3$, an n-type semiconductor layer 5 of $SnO_2$ or $In_2O_3$, an ion-polarizing solid state semiconductor compound layer 1 of $PbF_2$, a p-type semiconductor layer 6 of $Cr_2O_3$ or $Ni_2O_3$ and uppermost electrode film 4 of gold are sequentially vapor-deposited in this order. Of course a D.C. power source should be connected in a manner such that the positive holes are injected from the p-type layer 6 into the solid state compound layer 1, and that the electrons are injected from the n-type layer 5 into the solid state compound layer 1, namely, the electrode 4 to the positive terminal and the electrode 2 to the negative terminal, respectively, of the power source. Characteristics of displaying and erasing the letter or pattern of this example are more improved than that of the device of Example 1.

EXAMPLE 3

Figure 4:
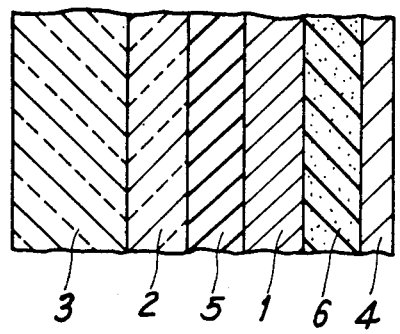
FIG. 4 is an enlarged schematic sectional view of a part of a third example embodying the present invention.

FIG. 4 is an enlarged sectional view of a function device embodying the present invention, wherein on a substrate 3 of glass, a transparent electrode layer 2 of $In_2O_3$, an n-type semiconductor layer 5 of $SnO_2$ or $In_2O_3$, an ion-polarizing solid state semiconductor compound layer 1 of $PbF_2$, a p-type semiconductor layer 6 of $Cr_2O_3$ or $Ni_2O_3$ and uppermost electrode film 4 of gold 4 are sequentially formed in this order.

By means of the above-mentioned content of the electron donating substance and the positive hole donating substance, the ion polarizing of the compound 1 is effectively attained.

In addition to the above-mentioned impressing of an electric field, other types of energy, for example, an electron beam, an ion beam, visible and invisible rays, heat and mechanical strain can be used as input signals to cause blackening of the ion-polarizing semiconductor compound 1. When a small amount of CdS, CdSe or the like visual-light sensitive substance is mixed in the ion-polarizing semiconductor compound 1, the device can be made particularly sensitive to visible light. When a small amount of $BaTiO_3$ or the like strain sensitive substance is mixed in the ion-polarizing semiconductor compound 1, the device becomes particularly sensitive to strains such as pressing by a pencil tip.

EXAMPLE 4

Figure 5:
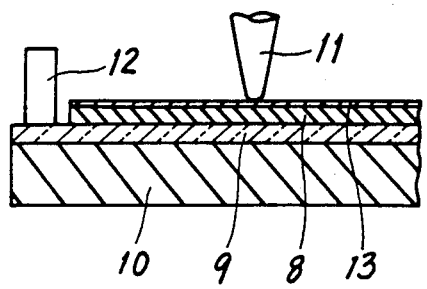
FIG. 5 is a schematic sectional view of a part of a fourth example embodying the invention.

FIG. 5 is an enlarged sectional side view of another type of the function device embodying the present invention, wherein on a substrate 10 of paper or a plastic sheet, a transparent electrode 9 of $SnO_2$ or $In_2O_3$ and pattern indicating layer 8 comprising the solid state chemical compound are formed. A D.C. voltage of between several volts to 50 volts is impressed across the lead out wire 12 connected to the transparent electrode 9 and a needle-shaped metal electrode 11 contacting the surface of the pattern indicating layer 8.

The pattern indicating layer 8 turns black at the part contacted by the needle-shaped pen 11. When the voltage is low, the black pattern is tint or grayish and when the voltage is high, the pattern becomes very black. When the voltage exceeds a specified threshold level, for example, 10 volts, the black pattern becomes permanently recorded even after removal of the applied voltage. The detailed principle of the permanent recording with the black pattern is not entirely clarified yet, but it is empirically confirmed that this phenomenon is obtainable with the pattern indicating compound containing lead. Also it is empirically found that the permanent recording can be made by a pulse and by a large amplitude A.C. signal. When the pattern is permanently recorded by impressing a sufficiently high voltage, the pattern is not erased even by illumination of ultraviolet rays or infrared rays.

When the pattern is recorded by a relatively low voltage, for example, the pattern can be erased by removing the voltage, by sweeping the surface of the pattern indicating layer 8 with a conductor brush which is shortcircuited to the transparent electrode 9 or by impressing a voltage inverse to that of the writing-in voltage.

For some chemically stable inorganic type ion polarizing compound, for example, $PbF_2$, it is possible to form the pattern indicating layer 8 by a CVD method, a sputtering method or an ion plating method. However, for other compound, it is recommended to form the film by dispersing the compound in a high polymer resin in order to avoid thermal decomposition or other adverse reactions during forming in high temperature.

For the solid state chemical compound in the pattern indicating film 8, at least one compound selected from the group of the following compounds is suitable for the permanent recording using a high voltage:

lead monoxide, lead chloride, lead bromide, lead iodide, lead fluoride, lead acetate, lead carbonide, lead chromate, lead phsophate, lead telluride, lead selenide, tetraryl lead and alkyl lead halide.

For some compound, it is preferable to form the pattern indicating film 8 by blending the fine powder of conductor and binder. Also, it is possible to form the film by a sequential CVD processes, for example, firstly $PbF_2$ film and secondly a semiconductor of a conductor type, for example, CrO thereon. It is further possible to form a mixed form of $PbF_2$ and CrO through a mixed CVD process.

When the chemical compound is in powder form, it is preferable to form the pattern indication film by blending a high polymer resin binder and a conductor powder.

For the conductor powder to be blended in the pattern indication film, powder of at least one oxide, sulfide, nitride or electrolyte selected from the below-mentioned group is suitable:

tin dioxide, indium trioxide, molybdenum trioxide, tungsten trioxide, molybdic acid, tungstic acid, cuprous iodide, zinc oxide, titanium dioxide, silver chloride, silver bromide, silver iodide, thallium chloride, an thallium iodide.

For the high polymer resin used as the binder, at least one thermoplastic resin, thermo setting resin, gum or adhesive selected from the below-mentioned group is suitable:

styren resins (polystyren, etc.), vinyl chloride resins (vinyl chloride resins, vinylidene chloride resin, etc.), fluorine resins (vinylidene chloride resins etc.), carbonate resins, urethane resins, vinyl acetate resins, cellulose resins, water-soluble resins (polyvinyl alcohol, polyvinyl pyrrolidone, polyethylene oxide etc.), methacrylic acid resins (methyl polymethacrylate etc.), epoxy resins, alkyd resins, urea resins, phenol resins, melamine resins, natural resins (starch etc.), copolymer resins (ethylenevinyl acetate copolymer resin etc.) and ester resins (acrylic ester etc.).

When the above-mentioned binder does not have sufficient plasticity, addition of at least a plasticizing agent selected from tricresyl phosphate, triphenyl phosphate, dioctyl adipate, disobuthyl phthalate, etc. in an amount of about 10% by weight of the binder makes a satisfactorily plastic film.

When the pattern indicating layer comprises compound of lead, the conductive substance and the binder, the amounts of the lead compound and the conductive substances for 10 parts by weight of the binder should be less than 200 parts by weight and 200 parts by weight, respectively.

White pigment such as $TiO_2$ powder to produce a white surface, smoothing agents such as a surface activator, and other necessary additives can be added in order to improve the practical characteristics as a recording media.

EXAMPLE 5

In the device of FIG. 5, on the surface of a high quality smooth paper as the substrate 10, a thin aluminum film as the electrode 9 is formed by the CVD process in a manner to have a surface resistance of less than $10\Omega/Cm^2$. Then, on the aluminum film 9, a film of $PbF_2$ is formed also by the CVD process so as to be greater than $1\mu$ thick. Finally, about $0.3\mu$ thick gold film 13 is formed thereon by the known CVD process. This gold film is so thin as to have a considerable surface resistance, and therefore, the electric field induced by the voltage across the electrode 9 and the gold film 13 is impressed only in the area limited immediately under the needle shaped metal electrode 11.

By impressing a D.C. voltage of 15 volts across the aluminum electrode 9 and the needle electrode 11, a clear black pattern was obtained under the needle electrode 11. By writing with the needle electrode on the composite recording paper of this example, the desired clear pattern is obtainable without the use of a electric spark or ink jet. If necessary, for example, for the sake of partial correction, the pattern can be erased by sweeping thereon an inverse voltage metal brush.

This device is suitable as a pattern recording media for example to be used in calculator, telefax, etc., since the substrate is inexpensive paper or plastic film and the pattern can be permanently recorded with a dense black pattern using a low voltage small current.

EXAMPLE 6

10 parts by weight of vinylidine chloride-acrylic ester copolymer resin as binder, 100 parts by weight of lead monoxide as pattern indicating compound, which is ground in a ball mill for more than 30 hours, and 90 parts by weight of copper iodide as the conductive substance, which is ground in a ball mill for more than 30 hours, are thoroughly mixed together. A high quality smooth paper as the substrate 10 is coated with a thin aluminum film 9 as an electrode having a surface resistance of less than $10\Omega/Cm^2$ as electrode 9. A film of the above-mentioned mixture as the pattern indicating film 8 is formed on the aluminum film 9 to a thickness of 15 μm by a screen printing process. Above the pattern indicating compound film 8, a thin electrode film 13 of about 3 μm is formed by mixing 120 parts by weight of copper iodide, which is ground in a ball mill for over 30 hours, with 10 parts by weight of the vinylidine chloride-acrylic ester copolymer resin and applying it on the compound film 8.

The thin electrode film 13 is so thin as to have a considerable surface resistance, and therefore, the electric field induced by the voltage across the electrode 9 and the uppermost thin electrode 13 is impressed only in a limited area immediately under the needle-shaped metal electrode 11.

By impressing a D.C. voltage of 20 volts across the aluminum electrode 9 and the needle electrode 11, a clear black pattern was obtained under the needle electrode 11. By writing with the needle electrode on the recording paper of this example, a desired clear pattern is obtainable without the use of an electric spark or ink jet.

The device of this invention is advantageous in that the current for writing the pattern is usually less than 1 mA and the voltage is also small in comparison with conventional recording apparatus using, for example, electrolytic recording.

The device of this invention is suitable for use as a pattern or letter recording media since the substrate is of inexpensive paper, the pattern indicating film and uppermost thin electrode film are made of a polymer resin mixture which can be mass produced and the pattern can be permanently recorded with a dense black pattern.

When one of the electrodes, for example the electrode 11 is formed as a figure, letter or pattern, an efficient printing on the recording sheet is possible.

What we claim is:

1. A solid state display device consisting essentially in the sequential layers of:
   (a) a transparent glass substrate;
   (b) a transparent electrode layer;
   (c) n-type semiconductor compound layer;
   (d) an ion-polarizing solid state semiconductor compound layer wherein said compound is selected from the group consisting of lead fluoride, cadmium fluoride, strontium fluoride, lead monoxide, lead chloride, cadmium oxide, cadmium chloride, thallium fluoride, mercury fluoride and barium fluoride;
   (e) a p-type semiconductor layer; and
   (f) an outermost electrode layer, all of said layers (b) through (f) inclusive being sequentially vapor deposited.

2. The solid state display device according to claim 1 wherein said transparent electrode layer (b) is $In_2O_3$.

3. The solid state display device according to claim 1 wherein said n-type semiconductor layer (c) is selected from the group consisting of $SnO_2$ and $In_2O_3$.

4. The solid state display device according to claim 1 wherein said ion-polarizing compound of layer (d) is $PbF_2$.

5. The solid state display device according to claim 1 wherein said p-type semiconductor layer (e) is selected from the group consisting of $Cr_2O_3$ and $Ni_2O_3$.

6. The solid state display device according to claim 1 wherein said outermost electrode layer (f) is a gold film.

7. The solid state display device according to claim 1 further including D.C. power means for injecting positive holes from said p-type layer (e) into said solid state compound layer (d) and means for injecting electrons from said n-type layer (c) into said solid state compound layer, thereby providing means for displaying and erasing a letter or pattern on said device.

8. A solid state pressure sensitive display device consisting essentially in the sequential layers of
   (i) a transparent glass substrate;
   (ii) a transparent electrode layer,
   (iii) n-type semiconductor layer;
   (iv) an ion polarizing solid state semiconductor compound layer wherein said compound is selected from the group consisting of lead fluoride, cadmium fluoride, strontium fluoride, lead monoxide, lead chloride, cadmium oxide, cadmium chloride, thallium fluoride, mercury fluoride and barium fluoride, one of said members being mixed with a strain-sensitive compound, said layer darkening upon application of pressure to said device;
   (v) a p-type semiconductor layer; and
   (vi) an outermost electrode layer, all of said layers (ii) through (vi), inclusive, being sequentially vapor deposited.

9. The solid state pressure sensitive display device according to claim 8 wherein said transparent electrode layer (ii) is $In_2O_3$.

10. The solid state pressure sensitive display device according to claim 8 wherein said n-type semiconductor layer (iii) is selected from the group consisting of $SnO_2$ and $In_2O_3$.

11. The solid state pressure sensitive display device according to claim 8 wherein said ion-polarizing compound layer (iv) is $PbF_2$.

12. The solid state pressure sensitive display device according to claim 8 wherein said non-polarizing layer (iv) is a mixture of lead fluoride and $BaTiO_3$.

13. The solid state pressure sensitive display device according to claim 8 wherein said p-type semiconductor layer (v) is selected from the group consisting of $Cr_2O_3$ and $Ni_2O_3$.

14. The solid state pressure sensitive display device according to claim 8 wherein said outermost electrode layer (vi) is a gold film.

* * * * *